(12) United States Patent
Peeters

(10) Patent No.: US 9,231,770 B2
(45) Date of Patent: *Jan. 5, 2016

(54) COMBINED DIGITAL CERTIFICATE

(71) Applicant: Texas Instruments Incorporated, Dallas, TX (US)

(72) Inventor: Eric Thierry Peeters, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,237

(22) Filed: Jul. 11, 2014

(65) Prior Publication Data

US 2015/0349963 A1    Dec. 3, 2015

Related U.S. Application Data

(63) Continuation of application No. 13/326,837, filed on Dec. 15, 2011, now Pat. No. 8,793,485.

(51) Int. Cl.
*H04L 29/06* (2006.01)
*H04L 9/32* (2006.01)
*H04L 9/30* (2006.01)

(52) U.S. Cl.
CPC ............ *H04L 9/3263* (2013.01); *H04L 9/3066* (2013.01)

(58) Field of Classification Search
USPC ......................................................... 713/156
See application file for complete search history.

(56) References Cited

U.S. PATENT DOCUMENTS

| | | | |
|---|---|---|---|
| 7,328,344 | B2 | 2/2008 | Chang |
| 7,340,601 | B2 | 3/2008 | Wray |
| 2002/0184491 | A1 | 12/2002 | Morgan et al. |
| 2003/0115457 | A1 | 6/2003 | Wildish et al. |
| 2007/0288747 | A1 | 12/2007 | Kwan et al. |
| 2009/0319783 | A1 | 12/2009 | Thornton et al. |
| 2010/0166188 | A1 | 7/2010 | Qu et al. |
| 2011/0087883 | A1 | 4/2011 | Campagna et al. |
| 2011/0145567 | A1 | 6/2011 | Liu et al. |
| 2011/0302411 | A1 | 12/2011 | Liang et al. |
| 2012/0317412 | A1 | 12/2012 | Zaverucha et al. |

OTHER PUBLICATIONS

Jinging Wu, Jing Jingqiang Lin, "A Decentralized Certification Authority Based on Real World Trust Relationships," 2008 International Conference on Computer Science and Software Engineering, pp. 1123-1126.
PCT/US2012/70014 Search Report, mailed Apr. 12, 2013.

*Primary Examiner* — Andrew Nalven
*Assistant Examiner* — Khang Do
(74) *Attorney, Agent, or Firm* — William B. Kempler; Frank D. Cimino

(57) ABSTRACT

A system can comprise a memory to store computer readable instructions and a processing unit to access the memory and to execute the computer readable instructions. The computer readable instructions can comprise a certificate manager configured to request generation of N number of random values, where N is an integer greater than or equal to one. The certificate manager can also be configured to request a digital certificate from at least one certificate authority of at least two different certificate authorities. The request can include a given one of the N number of random values. The certificate manager can also be configured to generate a private key of a public-private key pair, wherein the private key is generated based on a private key of each of the least two certificate authorities.

8 Claims, 6 Drawing Sheets

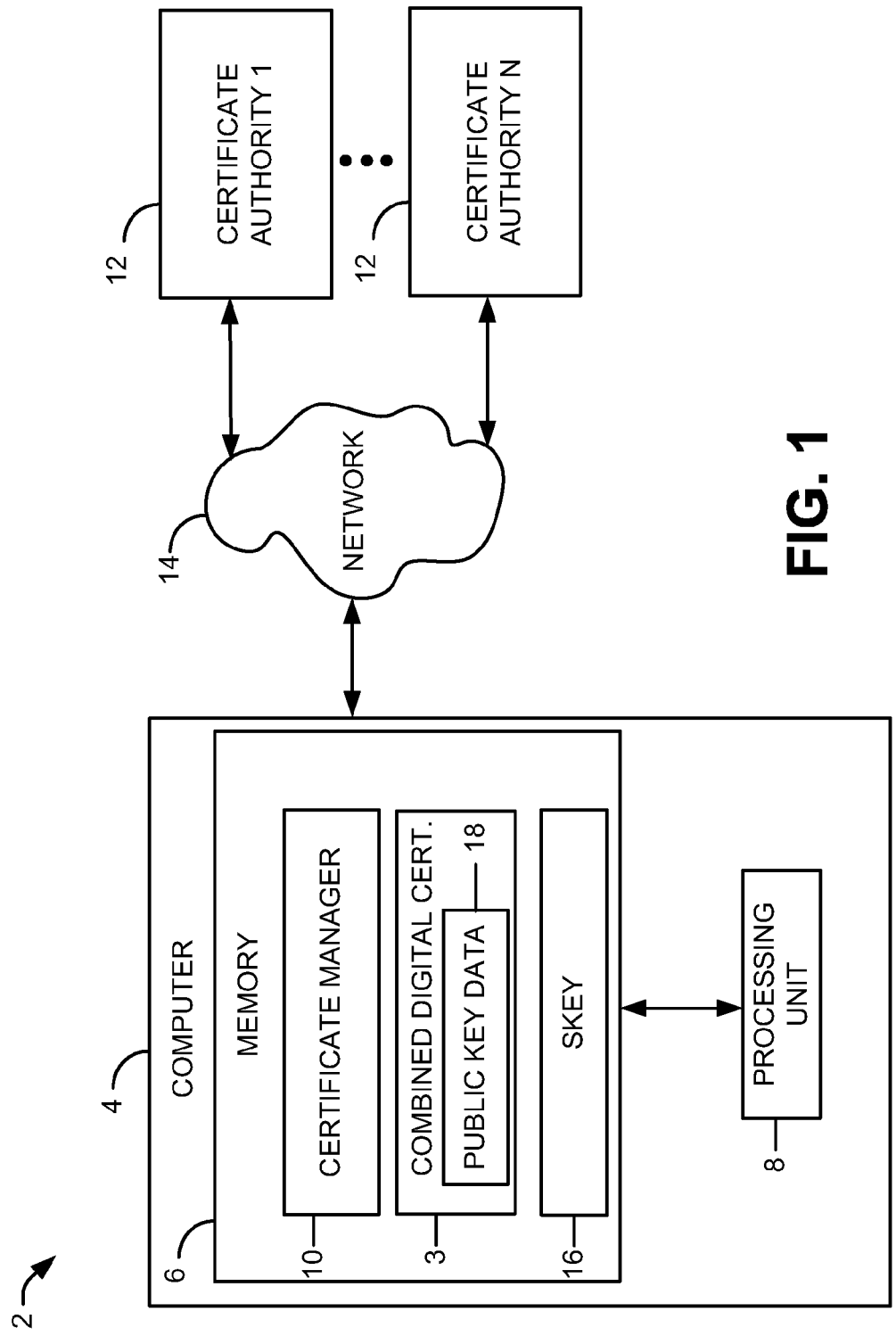

COMBINED DIGITAL CERTIFICATE

This is a continuation application of U.S. patent application Ser. No. 13/326,837, filed Dec. 15, 2011, now U.S. Pat. No. 8,793,485. This invention relates to a digital certificate. More particularly, this invention relates to a system and method for generating a combined digital certificate.

TECHNICAL FIELD

Background

Public-key cryptography refers to a cryptographic system requiring two separate keys, one to lock or encrypt plaintext, and one to unlock or decrypt cyphertext. One of these keys is published or public (a public key) and the other is kept private (a private key). If the lock/encryption key is the one published then the system enables private communication from the public to the unlocking key's owner. If the unlock/decryption key is the one published then the system serves as a signature verifier of documents locked by the owner of the private key.

Several different public-key primitives can be used to provide a digital signature. Some are based on a discrete logarithm problem and are referred to as discrete logarithm-based public-key cryptosystem. A public-key cryptosystem can be employed in various schemes for providing confidentiality, integrity, authentication or non-repudiation function. Non-repudiation or authentication can be achieved through a digital certificate such as a public key digital certificate. A public key digital certificate can include two parts: the data and a signature of the data. The data can include the public-key and a unique identifier of a subscriber to a trusted third party: the certificate authority (CA). A signature of the CA on the subscriber's public-key conveys an authentic binding between the subscriber public key and the subscriber's identity (ID).

SUMMARY

One example relates to a system that can comprise a memory to store computer readable instructions and a processing unit to access the memory and to execute the computer readable instructions. The computer readable instructions can comprise a certificate manager configured to request generation of N number of random values, where N is an integer greater than or equal to one. The certificate manager can also be configured to request a digital certificate from at least one certificate authority of at least two certificate authorities. The request can include a given one of the N number of random values. The certificate manager can also be configured to generate a private key of a public-private key pair, wherein the private key is generated based on a private key of each of the at least two certificate authorities.

Another example relates to a method for generating a combined digital certificate. The method can comprise generating, at a computer, N number of values at a computer, wherein N is an integer greater than or equal to two. The method can also comprise, providing, from the computer, a request that includes a given one of the N number of random values to a corresponding certificate authority of N number of certificate authorities. The method can further comprise receiving, at the computer, a digital certificate from each of the N number of certificate authorities. The method can still further comprise generating, at the computer, a private key for the computer based on a combination of data received from each of the N number of certificate authorities. The method can yet further comprise generating, at the computer, a combined digital certificate based on a combination of each digital certificate received from each of the N number of certificate authorities.

Yet another example relates to a method for generating a combined digital certificate. The method can comprise generating, at a computer, a random value. The method can also comprise providing, from the computer, the random value to a first of two certificate authorities. The method can further comprise receiving, at the computer, a digital certificate from a second of the two certificate authorities. The digital certificate can be based on a digital certificate generated at the first certificate authority. The method can still further comprise generating, at the computer, a private key for the computer based on a number from each of the two certificate authorities. The method can yet further comprise generating, at the computer, a combined digital certificate based on data included in the digital certificate received at the computer.

BRIEF DESCRIPTION OF THE DRAWINGS

Further aspects of the invention will appear from the appending claims and from the following detailed description given with reference to the appending drawings.

FIG. 1 illustrates an example of a system for generating a combined digital certificate.

DETAILED DESCRIPTION

Figure 2A:
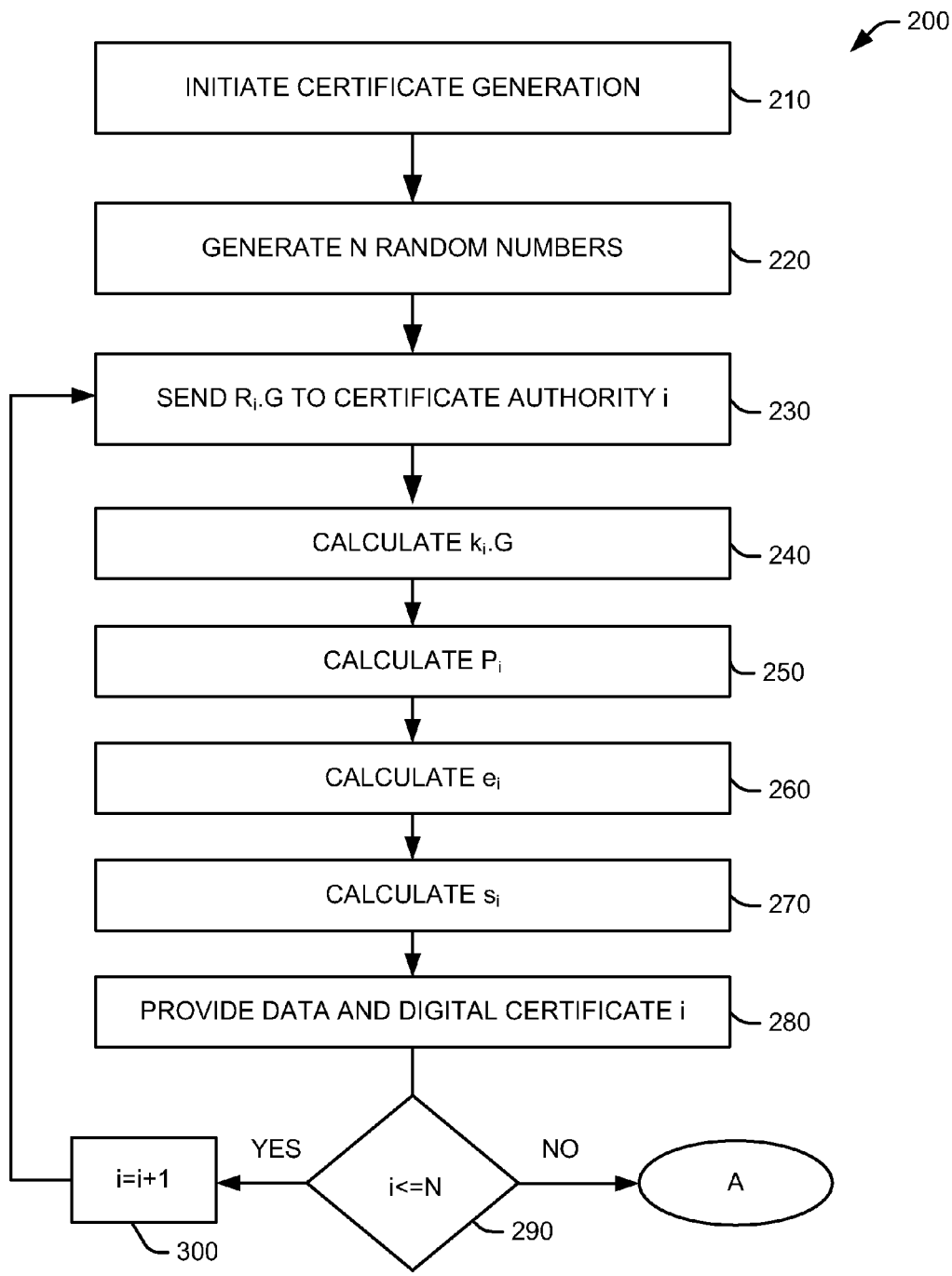
FIGS. 2A and 2B illustrate a flowchart of an example method for generating a combined digital certificate.

In one example, a computer, such as a crypto processor can be employed to generate and manage a combined digital certificate. The combined digital certificate can include data for generating a public key that is generated based on data received from multiple certificate authorities. Moreover, the computer can also generate a corresponding private key, which shall be stored separately (and securely) from the combined digital certificate. The private key can also be based on data provided from multiple certificate authorities. In this manner, even if an unauthorized user (e.g., a hacker) compromises one of the multiple certificate authorities, such an unauthorized user would be unable to determine the private key.

FIG. 1 illustrates an example of a system 2 for generating and managing a combined digital certificate 3. The combined digital certificate 3 can be generated by employing any discrete logarithm public key system, such as, but not limited to El-Gamal Signature, Schnorr Signature, Digital Secure Algorithm (DSA) or a variation thereof. Any of those schemes can use Elliptic curve cryptography (ECC) which provides inherently low memory and computation requirements. The system 2 can include, for example, a computer 4 that includes a memory 6 for storing machine readable instructions. The computer 4 could be implemented, for example, as a crypto processor, an application specific integrated circuit chip (ASIC), a smart card, a smart phone, a desktop computer, a notebook computer or the like. The memory 6 could be implemented, for example, as a non-transitory computer readable medium, such as random access memory (RAM), flash memory, a hard drive, etc. Some portions of the memory 6 can be accessed by external systems upon request. However, in some examples, some portions of the memory 6 can be secure and only accessible by internal components of the computer 4. The computer 4 can also include a processing unit 8 for accessing the memory 6 and executing the machine readable instructions. The processing unit 8 could be implemented, for example, as a processor core. The memory 6 can include a certificate manager 10 that can generate, modify and/or manage the combined digital certificate 3, which combined digital certificate 3, can also be stored in the memory 6. It is to be understood that in other examples, the certificate manager 10 could be stored on another system, such as an external system, such as a server or a host system, such a smart phone or other device that houses the computer 4.

The certificate manager 10 can initiate a generation of the combined digital certificate 3 in response to a condition being met. For instance, if the computer 4 is implemented as a crypto processor, the certificate manager 10 could initiate the generation of the digital certificate in response to an activation request from another system. In other examples, the certificate manager 10 could initiate the generation of the combined digital certificate 3 in response to user input.

The computer 4 can communicate with N number of certificate authorities 12 over a network 14, where N is an integer greater than or equal to two. The network 14 could be implemented, for example, as a public network (e.g., the Internet), a private network, or the like. Each certificate authority 12 of the N number of certificate authorities 12 can be implemented as a system that issues digital certificates. The digital certificate certifies the ownership of a public key by the named subject of the certificate. This allows others (third parties) to rely upon signatures or assertions made by a private key that corresponds to the public key that is certified. In such a model of trust relationships, each of the 1–N certificate authorities 12 is a trusted third party that is trusted by both the subject (owner) of the certificate and the third party relying upon the certificate.

In one example, in response to initiation of the generation of the combined digital certificate 3, the certificate manager 10 can request that N number of random numbers be generated by the processing unit 8, which random numbers can be referred to as "r1 . . . rN." It is noted that in some examples, the certificate manager 10, can provide separate requests over a relatively large period of time for generation of the random numbers. For instance, the certificate manager 10 can be configured to request generation of r1 at a time of manufacture. Additionally, the certificate manager 10 can be configured to request generation of r2-rN after delivery of the computer 4 to a customer site. As one example, the computer 4 can be embedded with r1 and can be configured to request generation of r2-rN upon activation at the customer site.

The certificate manager 10 can send r1 (or a multiple thereof) to certificate authority 1. In response, the certificate authority 1 can return a digital certificate 1 which can include data for generating a public key for the computer 4, wherein the public key is associated with the certificate authority 1. The certificate authority 1 can also include data, such as an integer for generating a private key that corresponds to the public key associated with the certificate authority 1. It is noted that in some examples, the digital certificate 1 and the data for generating the private key and public key associated with the certificate authority 1 can be embedded into the computer 4 at a time of manufacture of the computer 4. Additionally, the certificate manager 10 can send r2 . . . rN to a corresponding certificate authority 12 of each of the 2–N certificate authorities 12. In response, each of the 2–N certificate authorities 12 can provide the computer 4 with a corresponding digital certificate, and data for generating a public key and corresponding private key for the computer 4, which can be associated with a corresponding 2–N certificate authority 12, which data can be referred to as certificate data. The certificate manager 10 and/or the processing unit 8 can employ the certificate data provided by each of the 1–N certificate authorities 12 to generate a private key for the computer 4, which private key can be referred to as SKey 16. Moreover, in some examples, the certificate manager 10 can also provide public key data 18 that is based on the digital certificates 1-N for generating a public key for the computer 4 that corresponds to Skey 16, which can be referred to as PKey. In some examples, the public key data 18 can be provided to a third party. In other examples, the public key data 18 can be known by the third party through other methods (e.g., a registration service). In some examples, the certificate manager 10 can also generate the combination certificate 3 that can include the public key data 18. In some examples, the combination certificate 3 can also include data for identifying each of the 1–N certificate authorities 12. By employing this technique, the certificate manager 10 can generate the combined digital certificate 3 that is based on digital certificates provided by each of the 1–N certificate authorities 12. Moreover, by employing this technique, none of the 1–N certificate authorities 12 need to communicate with each other.

In another example, upon initiation of the generation of the digital certificate, the certificate manager 10 can request that one random number be generated by the processing unit 8, which random number can be referred to as r1. The certificate manager 10 can send r1 to certificate authority 1. In response, the certificate authority 1 can generate a digital certificate 1 and data (e.g., an integer) for generating a public key and corresponding private key for the computer 4. The certificate authority 1 can forward the data for generating the private key to the computer 4 and forward the digital certificate 1 to a certificate authority 2, wherein the private key is associated with certificate authority 1. Moreover, the certificate authority 2 can authenticate the certificate authority 1 to ensure that the digital certificate 1 originated from certificate authority 1 and not from an unauthorized source (e.g., a hacker). Certificate authority 2 can generate a digital certificate 2 based on the digital certificate 1 and forward the digital certificate 2 to the certificate manager 10, which digital certificate can include public key data 18 for generating a PKey associated with both certificate authority 1 and certificate authority 2. The certificate authority 2 can also provide data (e.g., an integer) for generating a private key associated with the certificate authority 2. The certificate manager 10 and/or the processing unit 8 can generate an SKey 16 based on data provided from the certificate authority 1 and the certificate authority 2, wherein the SKey 16 corresponds to the PKey. The certificate manager 10 and/or the processing unit 8 can also generate the combined digital certificate 3 based on the digital certificate 2. In some examples, the combined certificate 3 can include the public key data 18 which can be employed to generate the PKey. By employing this technique, the size of the combined certificate can be reduced, which can save memory.

In both techniques, the combined digital certificate 3 can be based on data provided by 1–N certificate authorities 12. In the first technique, even if an unauthorized user (e.g., a hacker) gains access to any one of the 1–N certificate authorities 12, the combined digital certificate 3 would not be compromised. In fact, to compromise the security of the combined digital certificate 3, such an unauthorized user would need to compromise to all of the 1–N certificate authorities 12. In the second technique, since the certificate authority 1 is authenticated by certificate authority 2, data provided by the certificate authority 1 can be trusted by the certificate authority 2. Thus, the combined digital certificate 3 provides significant resistance to security breaches. Moreover, liability for such security breaches would be distributed over each of the 1–N certificate authorities 12.

In view of the foregoing structural and functional features described above, example methodologies will be better appreciated with reference to FIGS. 2A, 2B, 3A and 3B. While, for purposes of simplicity of explanation, the example methods of FIGS. 2A, 2B, 3A and 3B are shown and described as executing serially, the present examples are not limited by the illustrated order, as some actions could in other examples occur in different orders and/or concurrently from that shown and described herein.

Figure 2B:
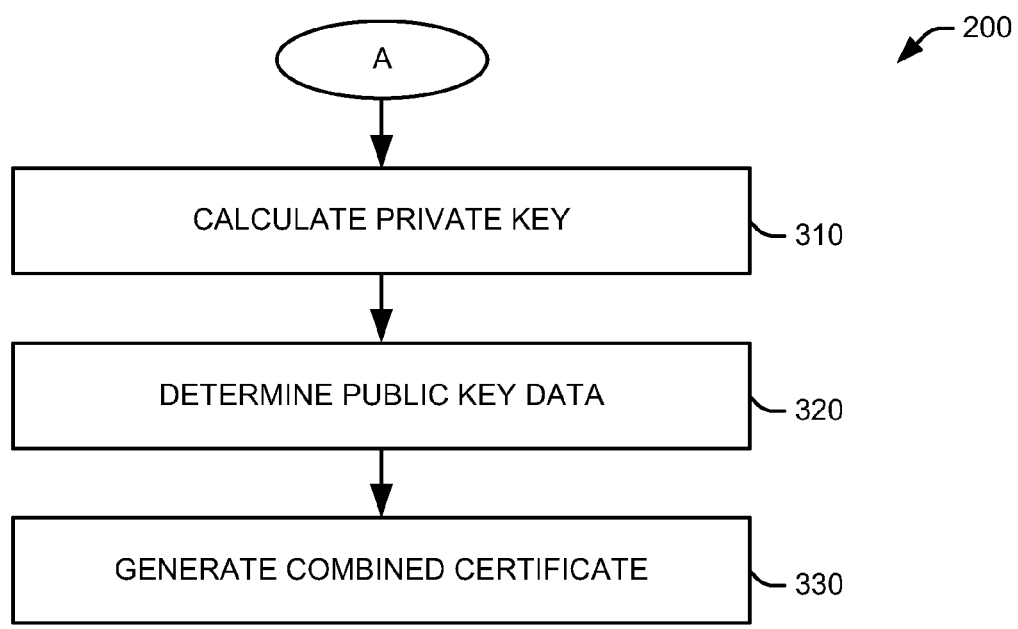

FIGS. 2A and 2B illustrate an example flowchart of an example method 200 that could be employed to generate a combined digital certificate, such as the combined digital certificate 3 illustrated in FIG. 1.

At 210, certificate generation can be initiated. The certificate initiation could be initiated, for example, by a certificate manager, such as the certificate manager 10 illustrated in FIG. 1. In such a situation, the certificate manager could be executing on a computer, such as a crypto processor. In the method 200, the combined certificate can be generated by employing techniques from ECC. However, other cryptographic techniques could be additionally or alternatively be employed. In ECC, points along a curve E can define a finite field. In one example, Equation 1 can define the finite field employed for the method 200.

$$y^2 = x^3 + ax + b;\qquad\text{Equation 1:}$$

wherein:
$P = \{X_P, Y_P\}$;
$Q = \{X_Q, Y_Q\}$; and
P and Q are points on the curve E.

Additionally, in ECC, the number of points on the curve E can be represented as a finite integer 'n'. In such a situation, Equations 2 and 3 can represent a relationship between n, P and Q.

$$nP = P + P + P \ldots + P\qquad\text{Equation 2:}$$

$$Q = nP\qquad\text{Equation 3:}$$

At 220, N number of random numbers can be generated, for example, by a processing unit, such as the processing unit 8 illustrated in FIG. 1. Each of the N number of random numbers can be calculated as points on the curve E. For instance, in one example, the processing unit can generate a random number, $r_i$, where i is an integer between 1 and N. The processing unit can employ elliptic curve point multiplication to calculate $r_i \cdot G$, where G is a number points on the curve E defined at a generator point G such that $r_i \cdot G$ is a point on the curve E. At 230, the certificate manager can provide a random number $r_i$ to a corresponding certificate authority i, which certificate authority i could be implemented as one of the 1–N certificate authorities 12 illustrated in FIG. 1. In such a situation, the certificate authority i can have a private key and noted as $C_{CAi}$ and a public key denoted as $Q_{CAi}$. In such a situation, Equation 4 can depict the relationship between $C_{CAi}$ and $Q_{CAi}$. It is noted that Equation 4 denotes elliptic curve multiplication.

$$Q_{CAi} = c_{CAi} \cdot G\qquad\text{Equation 4:}$$

In one example, for each subscriber A, each certificate authority i can assign a different identity number (e.g., a unique ID). In such a situation, each identity number could be implemented as the sum of each identity number attributed by each of the N number of certificate authorities ($ID_A = \Sigma(ID_{Ai})$). Alternatively, a given one of the certificate authorities i can have on a unique identity number shared by the other certificate authorities i. At 240, certificate authority i can calculate $k_i \cdot G$, where $k_i$ is a random number within the interval [1, n–1]. At 250, the certificate authority i can employ Equation 5 to calculate $P_i$. It is noted that Equation 5 denotes elliptic curve addition.

$$P_i = r_i \cdot G + k_i \cdot G\qquad\text{Equation 5:}$$

At 260, certificate authority i can employ Equation 6 to calculate $$e_i = H(P_i \| ID)\qquad\text{Equation 6:}$$

wherein:
H is a one way hash function;
$P_i$ is the resulting point of the elliptic curve addition given in Equation 5; and
ID is a unique identifier for the computer.

At 270, the certificate authority i can employ Equation 7 or alternatively Equation 8 to calculate $s_i$.

$$s_i = e_i \cdot k_i - c_{CAi} (\bmod n)\qquad\text{Equation 7:}$$

$$s_i = -e i \cdot C_{CAi} (\bmod n)\qquad\text{Equation 8:}$$

At 280, the certificate authority i can provide a digital certificate i and other data to the certificate manager, such that at least $P_i$, $s_i$ and $e_i$ are provided to the certificate manager. At 290, a determination can be made as to whether i is less than or equal to N. If the determination is positive (e.g., YES), the method 200 can proceed to 300. If the determination is negative (e.g., NO), the method can proceed to 310 (FIG. 2B). At 300, the value of i can be increased by one and the method can return to 230.

At 310 of FIG. 2B, the certificate manager can calculate a private key for the associated computer, which private key can be denoted as "SKey." SKey can be stored, for example, in a secure memory of the computer. In examples where Equation 7 is employed to calculate $s_i$, the certificate manager can employ Equation 9 to calculate SKey. Alternatively, in situations where Equation 8 is employed to calculate $s_i$, the certificate manager can employ Equation 10 to calculate SKey.

$$SKey = \left(\sum_{i=1}^{N} s_i + r_i e_i\right)(\bmod n)\qquad\text{Equation 9}$$

$$SKey = \left(\sum_{i=1}^{N} (s_i + r_i) \prod_{j \neq i} e_j\right)(\bmod n)\qquad\text{Equation 10}$$

At 320, the certificate manager can determine public key data that can be employed (e.g., by a third party) to calculate a public key corresponding to SKey for the associated computer, which public key can be denoted as "PKey." In some examples, the public key data can include the $P_i$ provided from each certificate authority i. In some examples, by employing Equations 11 and 12, the third party can employ the public key data to derive PKey. As shown in Equations 11 and 12, PKey can be based on $Q_{CA}$, which can be implemented as the sum of each $Q_{CAi}$ received from the 1–N certificate authorities. In other examples, the third party can employ Equations 12 and 13 to compute PKey.

$$PKey = \sum_{i=1}^{N} e_i P_i - Q_{CA} \qquad \text{Equation 11}$$

$$Q_{CA} = \sum_{i=1}^{N} Q_{CAi} \qquad \text{Equation 12}$$

$$PKey = \sum_{i=1}^{N} \left( P_i \prod_{j \neq i} e_j \right) - \left( \prod_{i=1}^{N} e_i \right) Q_{CA} \qquad \text{Equation 13}$$

At 330, the combined digital certificate can be generated. The combined digital certificate can identify each certificate authority i employed to generate the combined digital certificate. Moreover, in some examples, the combined digital certificate can include the public key data. By employing the method 200, no interaction between each of the certificate authorities i is needed. Furthermore, by employing ECC, a significant reduction of memory usage can be achieved in comparison to other encryption schemes.

Figure 3A:
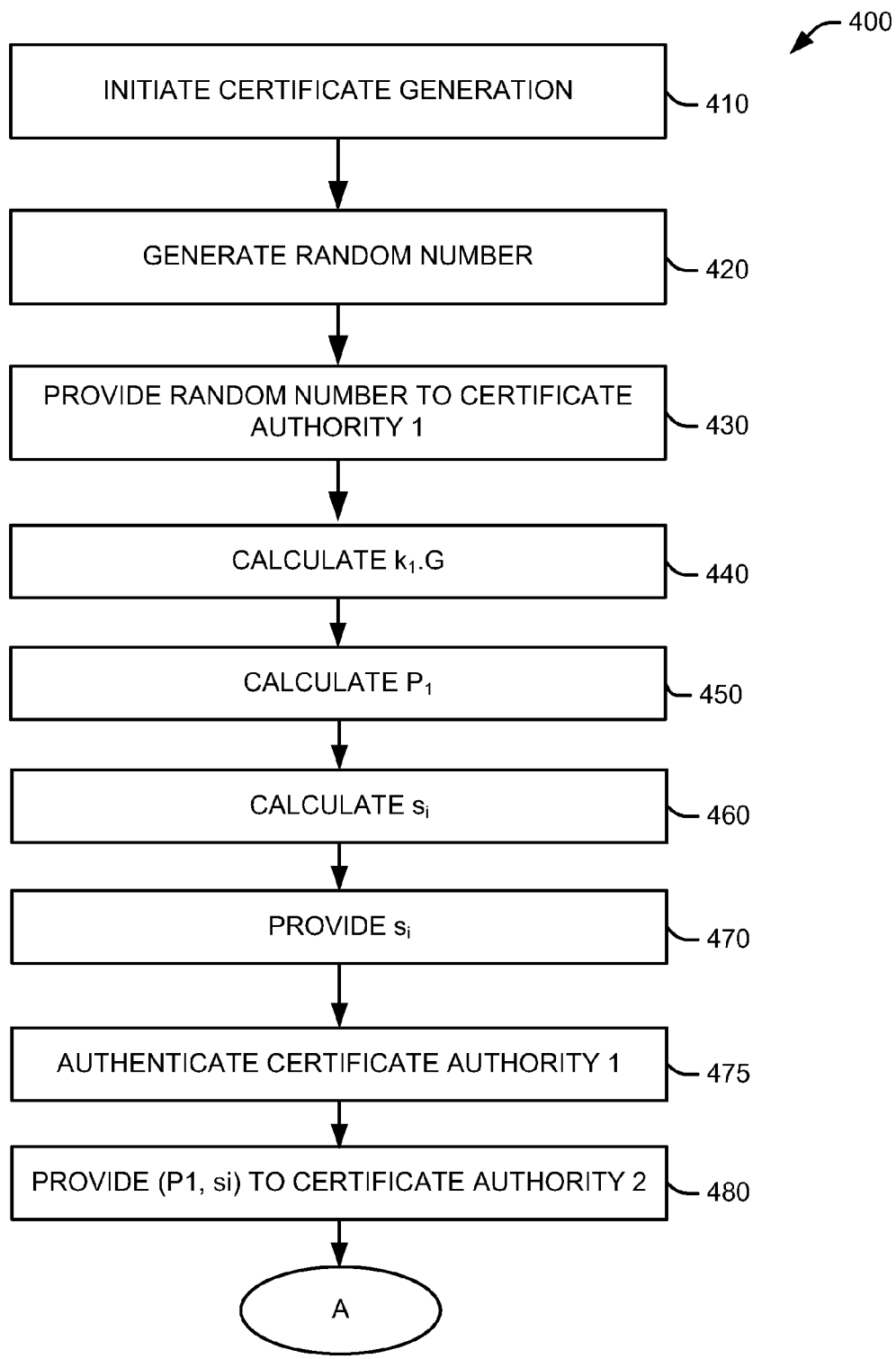
FIGS. 3A and 3B illustrate another flowchart of an example method for generating a combined digital certificate.
Figure 3B:
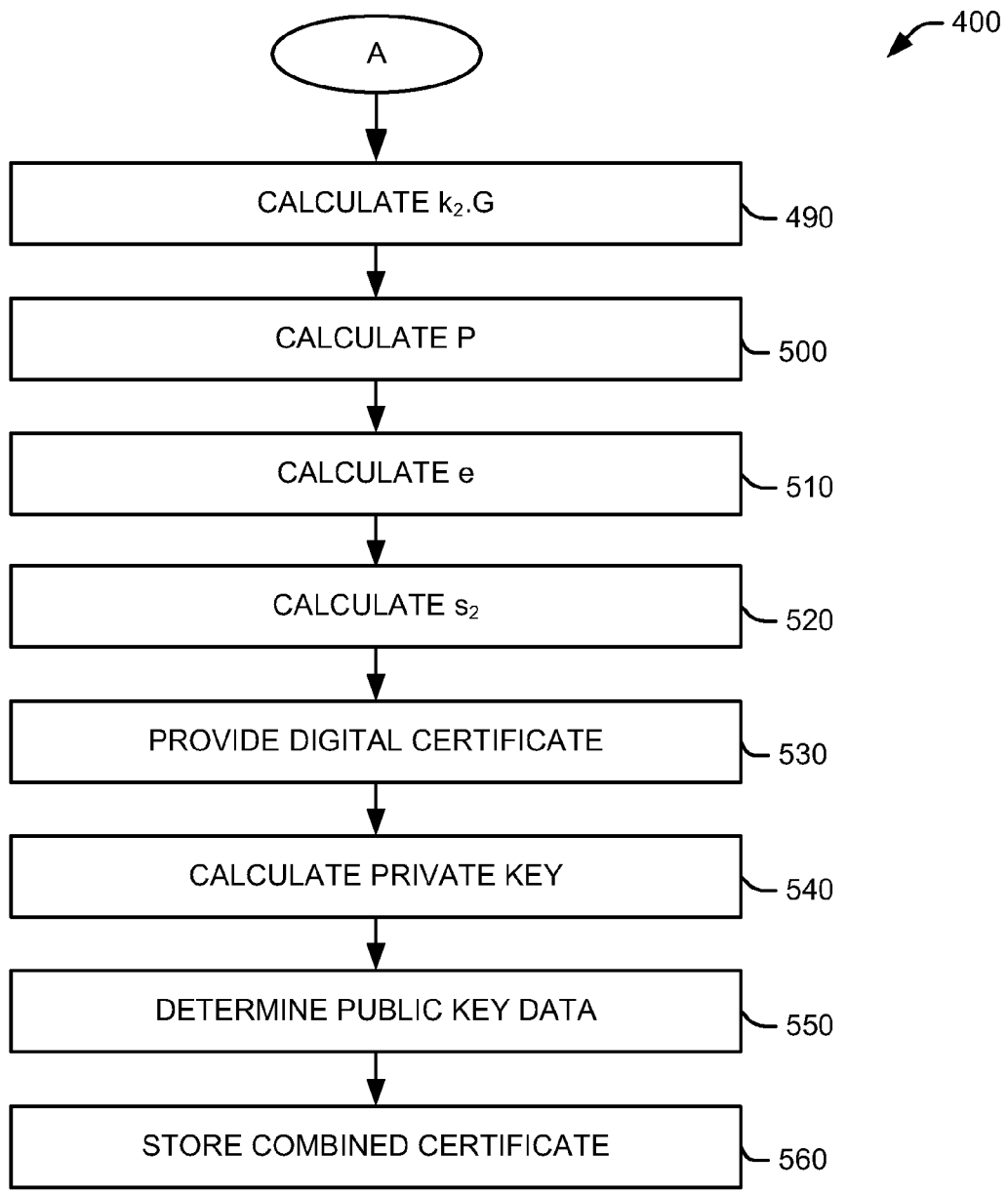

FIGS. 3A and 3B illustrate an example flowchart of another example of a method 400 that could be employed to generate a combined digital certificate, such as the combined digital certificate 3 illustrated in FIG. 1.

At 410, certificate generation can be initiated. The certificate initiation could be initiated, for example, by a certificate manager, such as the certificate manager 10 illustrated in FIG. 1. In such a situation, the certificate manager could be executing on a computer, such as a crypto processor. In the method 400, the combined digital certificate can be generated by employing techniques from ECC. However, other cryptographic techniques could be additionally or alternatively employed. In one example, Equation 1 can be employed to define a finite field for the method 400. In such an example, an elliptical curve E can have a finite number of points 'n'. Moreover, as noted in Equation 1, points P and Q can be points on the curve E. Further, Equations 2 and 3 can define a relationship between n, P and Q.

At 420, a random number can be generated, for example, by a processing unit, such as the processing unit 8 illustrated in FIG. 1. The random number can be calculated as a point on the curve E. For instance, in one example, the processing unit can generate a random number, r. The processing unit can employ elliptic curve point multiplication to calculate r·G, where G is a number of points on the curve E defined at a generator point G such that r·G is a point on the curve E. At 430, the certificate manager can provide the random number r·G to a certificate authority 1, which certificate authority i could be implemented as the certificate authority 1 illustrated in FIG. 1. In such a situation, the certificate authority 1 can have a private key, which private key can be referred to as $C_{CA1}$ and a public key denoted as $Q_{CA1}$. In such a situation, Equation 4 can depict the relationship between $C_{CA1}$ and $Q_{CA1}$. At 440, certificate authority 1 can calculate $k_1 \cdot G$, where $k_1$ is a random number within the interval [1, n−1]. At 450, the certificate authority 1 can employ Equation 5 to calculate $P_i$. At 460, certificate authority 1 can employ Equation 14 to calculate $s_i$.

$$s_1 = k_1 + c_{CA1} \bmod n \qquad \text{Equation 14:}$$

At 470, the certificate authority 1 can provide the certificate manager with data that includes at least $s_i$. At 475, certificate authority 1 can be authenticated by a certificate authority 2. Such an authentication can ensure that data provided from certificate authority 1 did in fact originate from certificate authority 1 and not from an unauthorized source (e.g., a hacker). At 480, the certificate authority 1 can provide the certificate authority 2 with $P_i$ and $s_i$. At 490 (FIG. 3B), the certificate authority 2 can calculate $k_2 \cdot G$, where $k_2$ is a random number within the interval [1, n−1]. At 500, the certificate authority 2 can employ Equation 15 to calculate P. It is noted that Equation 15 employs elliptical point multiplication.

$$P = k_2 \cdot G + P_1 \qquad \text{Equation 15:}$$

At 510, the certificate authority 2 can employ Equation 16 to calculate e.

$$e = H(P \| ID) \qquad \text{Equation 16:}$$

wherein:
H is a one-way hash function; and
ID is a unique identifier for the computer.

At 520, the certificate authority 2 can calculate $s_2$. In some examples, the certificate authority 2 can employ Equation 17 to calculate $s_2$.

$$S_2 = e(k_2 + c_{CA2}) \bmod n \qquad \text{Equation 17:}$$

At 530, the certificate authority can provide the certificate manager with a digital certificate that includes at least P (Equation 15). Additionally, the certificate authority can provide the certificate manager with $s_2$. At 540, the processing unit can calculate a private key for the computer, which private key can be denoted as "SKey." In examples where Equation 17 is employed to calculate $s_2$, the processing unit can employ Equation 18 to calculate SKey.

$$SKey = e(s_1 + r) + s_2 \bmod n \qquad \text{Equation 18:}$$

At 550, the certificate manager and/or the processing unit can determine public key data that can be employed to generate a public key for the associated computer, which public key can be denoted as "PKey." The public key data can include the P received from certificate authority 2. In this manner, a third party can employ the public key data to calculate PKey. For instance, in examples where Equation 18 is employed to calculate SKey, the third party can employ Equations 19 and 20 to calculate PKey.

$$Q_{CA} = Q_{CA1} + Q_{CA2} \qquad \text{Equation 19:}$$

$$PKey = e(P + Q_{CA}) \qquad \text{Equation 20:}$$

At 560, the certificate manager can generate and store the combined digital certificate. In some examples, the combined digital certificate can include the public key data. By employing the method 400, a reduction of the memory can be achieve since only one value for P needs to be stored at the computer. Moreover, additional memory saving can be achieved by employing ECC. Still further, the method allows an increase in security since the combined digital certificate is based on public keys $Q_{CA1}$, and $Q_{CA1}$ of two different certificate authorities.

Figure 4:
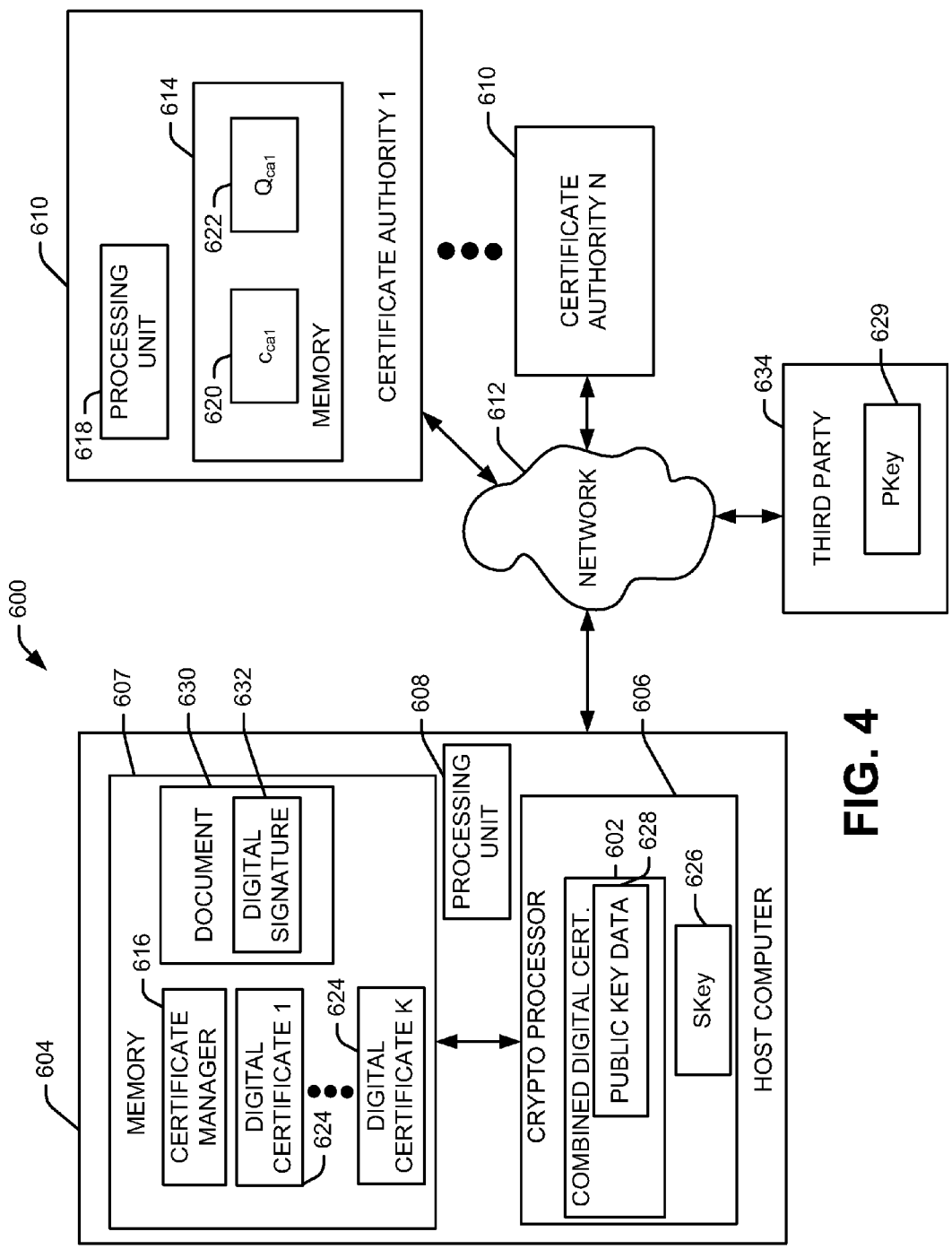
FIG. 4 illustrates another example of a system for generating a combined digital certificate.

FIG. 4 illustrates another example of a system 600 for generating and managing a combined digital certificate 602. The system 600 can include a host computer 604 with a crypto processor 606 stored thereon. The crypto processor 606 could be implemented, in a manner similar to the computer 4 illustrated in FIG. 1. For instance, the crypto processor 606 could be implemented as a dedicated computer on a chip or microprocessor for carrying out cryptographic operations, embedded in a packaging with multiple physical security measures, thereby providing the crypto processor 606 with a degree of tamper resistance. In one example, the crypto processor 606 could be implemented as a trusted platform module (TPM). The host computer 604 can include a memory 607 (e.g., a non-transitory computer readable medium, such as RAM, flash memory, a hard drive or the like) for storing machine-readable instructions. The host computer 604 can also include a processing unit 608 to access the memory 607 and execute the machine-readable instructions. The processing unit 608 can include a processor core. In some examples, the host computer 604 could be implemented as a smart phone, a desktop computer, a laptop computer, a server or the like.

The host computer 604 can communicate with N number of certificate authorities 610 via a network 612. The network 612 could be implemented, for example, as the Internet, a private network or a combination thereof. In FIG. 4, the components of certificate authority 1 are shown in detail. It is to be understood that 2–N certificate authorities 610 could be implemented in a similar manner. Certificate authority 1 can be implemented as a computer, such as a trusted issuer of digital certificates.

Certificate authority 1 can include a memory 614 for storing machine-readable instructions. The memory 614 could be implemented, for example, as RAM, flash memory, a hard drive or the like. The certificate authority 1 can also include a processing unit 618 for accessing the memory 614 and executing machine readable instructions. The memory 614 can include a private key, $C_{CA1}$ 620 for the certificate authority 1. The certificate authority 1 can also include a public key, $Q_{CA1}$ 622 for the certificate authority 1.

The memory 607 of the host computer 604 can include a certificate manager 616 that can initiate generation of the combined digital certificate 602. Initiation of the generation of the combined digital certificate 602 can be in response to user input. In response to initiation of the generation of the combined digital certificate 602, the certificate manager 616 can request that the crypto processor 606 generate one or more random numbers, such as described with respect to FIGS. 2A, 2B, 3A and 3B.

As described with respect to the methods 200 or 400 illustrated in FIGS. 2A, 2B, 3A and 3B, in response to initiation of the generation of the combined digital certificate 602, the certificate manager 616 can receive at least K digital certificates 624 from 1–N certificate authorities 610, where K is an integer greater than or equal to one, as well as data from each of the 1–N certificate authorities 610 (e.g., $s_1 \ldots s_n$). The certificate manager 616 can provide the crypto processor 606 with data (e.g., certificate data) to generate a private key (SKey) 626 and public key data 628 for generating a corresponding public key (PKey) 629 for the crypto processor 606 based on data provided from the 1–N certificate authorities 610 (e.g., $s_1 \ldots s_n$ and $P_1 \ldots P_n$). Additionally, the crypto processor 606 can employ the data provided by the certificate manager 616 to generate the combined certificate 602 In some examples, the combined certificate 602 can include the public key data 628. The combined certificate 602 can include, for example, an identification of each of the N number of certificate authorities 610 on which the combined digital certificate 602 is based.

At some point in time, the host computer 604 can employ the combined certificate to digitally sign a document 630. In such a situation, the certificate manager 616 can provide the document 630 to the crypto processor 606 along with a request for the digital signature 632. In one example, the crypto processor 606 can employ a digest algorithm to create a digest comprised of a portion of the document 630. The crypto processor 606 can employ the SKey 626 to sign the digest of the document 630, which signed digest can be the digital signature 632.

A third-party 634 (e.g., a computer system) can request the document 630. The document 630, the combined certificate 602 along with the digital signature 632 and a public key ($Q_{CAi}$) of a given certificate authority 610 of the N number of certificate authorities 610 can be provided to the third-party 634. The combined certificate can also include the digest algorithm employed for calculating the digest of the document 630. Additionally, the third party 634 can generate PKey 629 based on the public key data 628.

The third-party 634 can communicate with the given certificate authority 610 to validate the public key ($Q_{CAi}$) of the given certificate authority 610. In this manner, the third-party 634 can trust that PKey 629 was generated based on the private key ($C_{CAi}$) of the given certificate authority 610. Additionally, the third-party 634 can employ the digest algorithm to regenerate the digest of the document 630. The third-party 634 can verify the digital signature 632 with the PKey 629 included in the combined digital certificate 602, which can result in a verified digest. The third party 634 can compare the regenerated digital digest with the verified digest to ensure that the document 630 was signed by the crypto processor 606 and that the document 630 had not changed since the digital signature 632 for the document 630 was generated.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for generating a combined digital certificate comprising:
    generating, at a computer, N number of random values, wherein N is an integer greater or equal to two;
    providing, from the computer, a request to N corresponding equal authority certificate authorities;
    receiving, at the computer, a digital certificate from each of the N number of certificate authorities in response to the request;
    generating, at the computer, a private key for the computer based on a combination of data received from each of the N number of certificate authorities; and
    generating, at the computer, a combined digital certificate based on a combination of each digital certificate received from each of the N number of certificate authorities.

2. The method of claim 1, wherein each digital certificate received from each of the N number of certificate authorities is generated based on elliptical curve cryptography.

3. The method of claim 2, wherein each of the N number of random values characterizes a point on an elliptical curve.

4. The method of claim 3, wherein a digital certificate from the N number of certificate authorities comprises a set of numbers characterizing a point on the elliptical curve, wherein the point on the elliptical curve is calculated based on the given one of the of the N number of random values.

5. A method for generating a combined digital certificate comprising:
- generating, at a computer, a random value;
- providing the random value to a first of two independent certificate authorities having equal authority for generating a first digital certificate;
- receiving, at the computer, the first digital certificate and a digital certificate from a second of the two certificate authorities, wherein the digital certificate is based on a digital certificate generated at the first certificate authority;
- generating, at the computer, a private key for the computer based on a number from each of the two certificate authorities; and
- generating, at the computer, a combined digital certificate based on data included in the digital certificates received at the computer.

6. The method of claim 5, further comprising generating a public key for the computer corresponding to the private key for the computer, wherein the public key is based on a public key of each of the two certificate authorities.

7. The method of claim 5, wherein the digital certificate received from the second of the two certificate authorities is based on elliptical curve cryptography.

8. The method of claim 7, wherein the computer is a crypto processor.

* * * * *